United States Patent [19]
Stuttler

[11] Patent Number: 6,076,929
[45] Date of Patent: *Jun. 20, 2000

[54] MICROSCOPE, INCLUDING AUTOMATIC OCULAR ADAPTATION

[75] Inventor: Herbert M. Stuttler, Rankweil, Austria

[73] Assignee: Leica Microsystems AG, Heerbrugg, Switzerland

[*] Notice: This patent is subject to a terminal disclaimer.

[21] Appl. No.: 09/300,177

[22] Filed: Apr. 27, 1999

Related U.S. Application Data

[63] Continuation of application No. 08/913,121, filed as application No. PCT/EP95/04178, Mar. 13, 1996, Pat. No. 5,907,431.

[30] Foreign Application Priority Data

Mar. 14, 1995 [CH] Switzerland ............................. 723/95
Mar. 14, 1995 [CH] Switzerland ............................. 724/95

[51] Int. Cl.$^7$ .................................................. G02B 21/22
[52] U.S. Cl. ........................................... 351/211; 359/379
[58] Field of Search ..................................... 351/204, 206, 351/210, 211; 359/376, 377, 379; 205/201.1, 201.3

[56] References Cited

U.S. PATENT DOCUMENTS

| | | | |
|---|---|---|---|
| 4,661,692 | 4/1987 | Kawaski | 359/381 |
| 4,828,381 | 5/1989 | Shindo | 351/211 |
| 5,094,522 | 3/1992 | Sourdille et al. | 351/210 |
| 5,420,716 | 5/1995 | Fukaya | 359/368 |
| 5,563,670 | 10/1996 | Tenmyo | 396/373 |
| 5,694,628 | 12/1997 | Nishitani | 396/379 |

Primary Examiner—George Manuel
Attorney, Agent, or Firm—Simpson, Simpson & Snyder, L.L.P.

[57] ABSTRACT

The invention concerns a microscope, in particular an operating microscope with a remote controlled adjustment system (32) for an ocular (8); the adjustment system preferably facilitates automatic adjustment of the ocular to match the optical characteristics of the user's eye (1). A further development also facilitates automatic adjustment of the separation of the eyepiece tubes in a stereomicroscope.

76 Claims, 8 Drawing Sheets

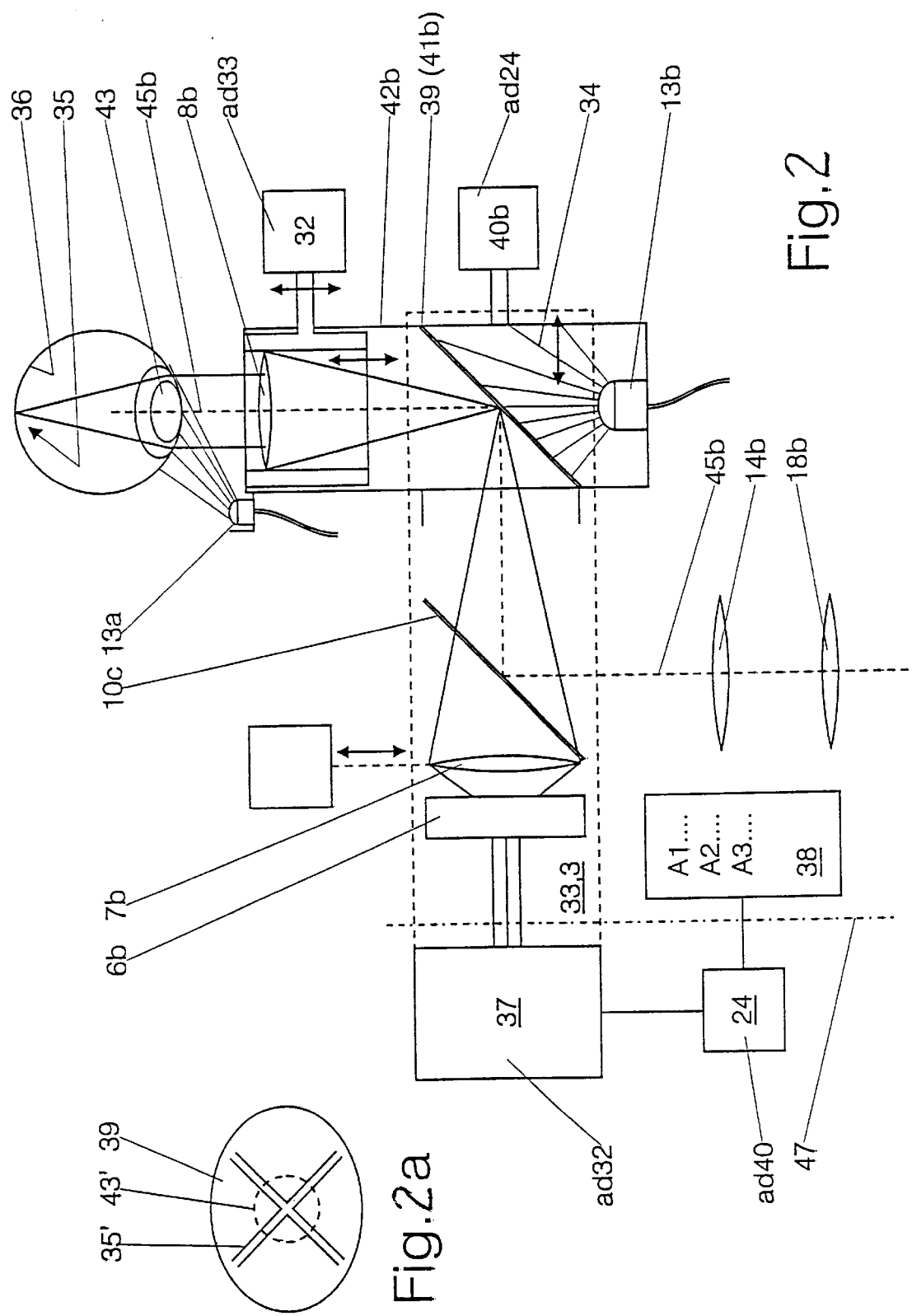

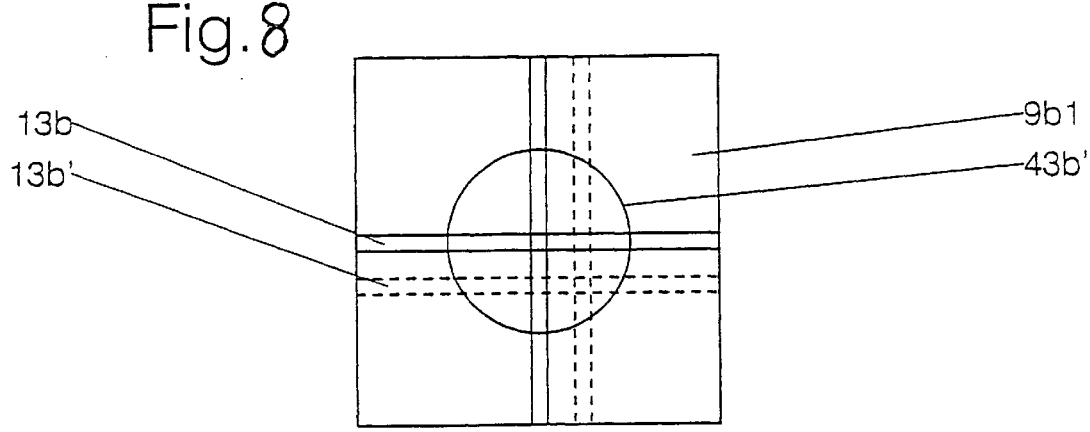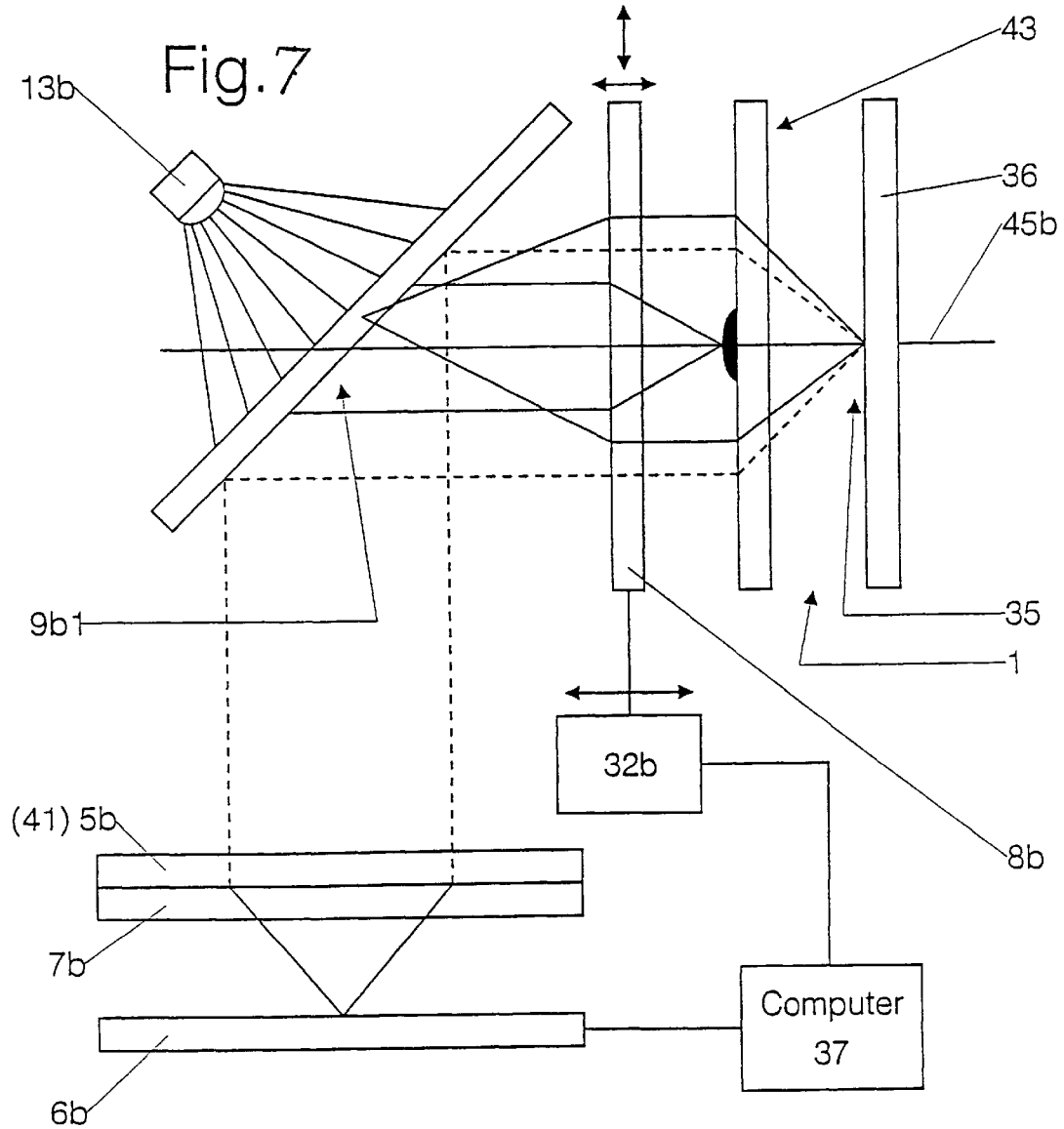

MICROSCOPE, INCLUDING AUTOMATIC OCULAR ADAPTATION

This application is a continuation of U.S. application Ser. No. 08/913,121, filed Sep. 8,1997 now U.S. Pat. No. 5.907, 431, which was the National Stage of International Application No. PCT/EP95/04178, filed Mar. 13, 1996.

BACKGROUND OF THE INVENTION

The invention concerns a microscope, especially but not limited to a stereomicroscope, with at least two tubes with an adjustable ocular and an automatic means of adjustment dependent on the other eye to adapt the optical properties of the ray path in the microscope to the optical properties of the user's eyes.

In microscopy, the microscope is a means to enlarge small objects. Those objects must often be transported or moved manually. Frequently it is necessary to manipulate them, as is particularly the case in surgical microscopy. In manipulation of objects, various conditions prevail which often make it difficult or undesirable to operate the adjustments of the microscope. Nevertheless, adjustment of oculars is an important procedure to give the user an optimal and non-fatiguing view of the object. Due to a certain adaptation or fatigue behavior of the eye, it is often necessary to readjust the oculars. With the means available at the state of the technology, that requires interrupting the manipulations under the microscope so that the oculars can be adjusted manually. That is undesirable, though, and that gives rise to the first objective on which the invention is based:

The magnifying system, with its ocular, must be of such a nature that it can be adjusted without using hands. The physiological difference between two eyes of the user should be taken into consideration. The existing standard, by which the difference in visual acuity between two eyes would be compensated for by adapting just one ocular should be replaced so as to compensate for variations in visual acuity of both eyes during a period of observation, thus preventing symptoms of fatigue.

This objective is achieved by use according to the invention of a microscope with the features of claim 1.

Means of remotely controlled adjustment of an ocular are, to be sure, already known in themselves, as, for example, from European Patent Application 2-625332.

There an automatic ocular adaptation according to measured physiological characteristics of the user's eyes is recommended. Although the use of such a system for a microscope is mentioned in this document, it was apparently not recognized at that time that adapting to just one of the user's eyes is inadequate to attain optimum comfort, as that can cause fatigue phenomena, headaches, etc., which can have unpleasant consequences during surgery on humans or animals. Continuous readjustment of the objective focusing, which is done in that patent, as previously, hardly helps, as that, too, must be controlled by the user. That requires that the user concentrate on the adjustment process rather than freeing the user to carry out his real work under the microscope.

Japanese Patent Application 66340 0refers to binoculars with magnification compensation in the binocular for both the user's eyes, as well as automatic matching of the two ocular beam paths to the distance between the user's eyes. It is not obvious, though, to apply teachings from another field of optics directly to microscopy. Also, in practice different experts have evolved who have caused the development of the individual specialties to diverge from each other. That also explains why the later European Patent Application makes no reference to the earlier Japanese Patent Application or to its teaching about using magnification compensation in both beam paths.

An adjusting system according to the invention can be achieved with various means. In any case, it requires a motor drive for each ocular and remote control for that drive, which may also be voice-controlled if desired, or which can be triggered or operated by means of a user's extremities; e.g., by his feet. Remote controls operated by other persons at the wish of, and under the instruction of, the user are also conceivable.

This first step of the invention yields enormous advantages for various applications. In the field of surgical microscopy, for instance, it was always extremely difficult to adjust oculars for the operator under the aseptic conditions required. As soon as the operator brings his head near the microscope there is a danger that his breathing, or accidental contact of the oral mask, etc., with the microscope will contaminate the tube part of the microscope. Thus a later manipulation by the operator or an assistant of the usual adjustment mechanisms in the tube part was always linked with a risk of contaminating the outside of the sterile surgical glove. Then the only way to avoid potential subsequent contamination of the patient was to replace the gloves. That was time-consuming and therefore very stressful. Pre-adjustment of the oculars before surgery was not sufficient because, as already noted, the optical properties of an eye are subject to variations which depend on the current state of the user.

This current state of the user can change, though, and generally requires repeated readjustment of the oculars. By means of the invention, though, all human manipulation of the microscope is unnecessary. Refocusing of the main objective to adapt to changed optical properties of the user's eye can be omitted if the object-microscope distance remains the same. That is, of course, also advantageous if the users are changed.

The automatic and continuous adjustment for each eye, according to measured criteria, also eliminates an unpleasant phenomenon that has been unavoidable. That happens when the user, in making an ocular adjustment, accidentally calls on the adaptive ability of the eye, so that the adjustment is not made optimally. That also causes a certain fatigue of the eye which can in some circumstances result in head pain or similar discomfort.

SUMMARY OF THE INVENTION

It is from this viewpoint that the preferred variation, in which the measurement system and the adjustment system linked with it are continuously adapted to the measured optical properties, is optimal. It allows use of the microscope with the eyes completely relaxed. 'Continuous', in the meaning of the invention, should be understood as either ongoing measurement and adjustment or intermittent measurement and adjustment.

Other embodiments or variants of the invention are presented or described in the subclaims.

The measuring system which has proved to be ideal uses a measuring beam, particularly but not limited to an invisible one, such as an infrared beam, to form an image on the retina of the user's eye. If the measuring system has a CCD or a sensor with similar function with the required imaging optics and a system for evaluating the measurements, the image formed on the retina can be utilized optimally to determine the optical properties of the user's eyes.

Such measuring systems are themselves known in ophthalmology as patient-independent instruments for measuring visual impairments. One skilled in the art can refer to these known systems (such as are described, for example, in European Patent Application 2-625332) in putting this invention into practice. Obviously the invention covers not only measuring instruments which produce images directly with contours and measure them, but also laser analyzers and the like.

The inventions reported here are particularly suitable for combination with the teaching of commonly owned U.S. patent application Ser. No. 08/817,634 filed Apr. 24, 1997 and claiming priority of Swiss Patent Application CH 3217/94. To that extent, the characteristics of the features and the accompanying description are considered as incorporated by reference in this application. The combination of an eye-controlled operation of a microscope and its attachments with a remotely controlled or automatic ocular adaption is particularly advantageous. In that respect it is recommended that the instrument for evaluating the measurements be linked with a data-processing system which simultaneously determines the positions of the user's eyes or pupils in the working state in order to control positioning means, devices or equipment etc., corresponding to U.S. patent application Ser. No. 08/817,634. Under some circumstances a single CCD per ray path is sufficient.

If the instrument for evaluating measurements and/or the data-processing system has a memory for storing and automatic recall of adjustment data or processes for the microscope in relation to the user, who can be input, the measurement and adjustment routines and their time course can be abbreviated. Then it is also possible to make a rough pre-adjustment on the basis of the identified user.

Of course, the invention also covers variations having a keyboard, control knobs, or the like for manual entry of certain preliminary settings.

In the detailed design of the measuring instrument it may be advantageous to provide a light-emitting or laser diode, which is itself known, to produce the measuring beam, especially but not limited to the IR region. The light from the diode passes through a perforated or slotted mask to the ocular or user's eye in order to define the shape of the image (the mask pattern) on the retina.

Stereomicroscopes usually have an adjustment for interpupillary distance. According to a further embodiment of the invention, which can also be used independently of the invention, it can also be remotely controllable and include a means for detecting the pupil position so that the position of each pupil of each user eye can be determined in relation the center of its beam path and so that the separation between the tubes can be adapted automatically to the distance between the user's eyes. It is preferable for the means which adjusts for interpupillary distance also to adjust the measuring instrument and, if necessary, also to adjust the perforated or slotted mask and/or the diode for the measuring beam, to match the spatial adjustment of the tubes. The means of detecting the pupil positions, as is described in U.S. patent application Ser. No. 08/817,634, can be used particularly well. It provides both functions, that is, acceptance of commands related to eye movement as well as centering the particular beam path to the actual direction of view of the eye. Here, again, it is advantageous that a manual adjustment can be omitted. If both the image of the perforated or slotted mask and the periphery of the pupil of the user's eye are imaged on the CCD or measuring sensor, it can at the same time serve as a measure for centering about the center of the beam path as long as the image being measured, e.g., from the perforated or slotted mask, has a fixed relation to the center of the beam path. It can also be helpful to utilize the reflection of this image at the surface of the eye as a reference, as it appears there in about the same image plane as the pupil.

Of course, it can also be preferred that the measuring instrument for magnification compensation be designed for ocular adjustment, so that it simultaneously provides information about interpupillary distance.

Furthermore, the use, according to the invention, of an electrically remotely controllable adjusting means for at least one of the two tubes in the horizontal direction, depending on the interpupillary distance of a user, is new and inventive.

Such a remotely controllable adjusting means can be achieved in various ways. The teaching from the other optical specialty, binocular technology, can be utilized according to the Japanese patent application.

In any case, a motorized drive is required for the adjustable tube or for both adjustable tubes, and a remote control for that drive. The remote control can, for example, be voice-controlled, or it can be operated by other extremities of a user, e.g., his feet. Remote control systems which can be operated by other persons at the wish of and under the instruction of the user are also conceivable. The invention obviously includes radio remote control.

This inventive step produces enormous advances for various applications. In the field of surgical microscopy, for instance, it has always been extremely difficult to make tube adjustments for the operator under the necessary aseptic conditions. As soon as the operator brings his head near the microscope there is a danger that, as mentioned previously, the tube portion of the microscope will be contaminated by the operator's breath or by accidental contact of his face mask or the like with the microscope. Thus operator adjustments to the usual adjusting systems in the vicinity of the tubes was always linked with the risk of contaminating the sterile exteriors of his gloves.

Pre-adjustment of the tube separation before surgery was also not optimal. It also required additional time and had the disadvantage that the tubes could not be adjusted after cleaning or sterilizing the microscope. That was hardly acceptable.

Aside from that, though, there may be a need during use to replace the initial user by another user. As a rule that requires readjustment of the tubes. That requires a certain exertion in spite of remote control according to the invention. Therefore a second step of the invention is based on a further objective of making any human manipulation of the tube adjustment unnecessary.

This further objective is achieved by using an adjusting means according to the invention which automatically, and continuously if desired, adjusts the tube or tubes in the working state, depending on the actual interpupillary distance of the particular user.

In the meaning of this new achievement it is conceivable that the actual interpupillary distance of the particular user (e.g., 71 mm) could be specified or input; but a variation of the invention is preferred, according to which a measuring instrument is assigned to at least one of the user's eyes to measure its position with respect to the optical central axis of the particular beam path, so that the measuring instrument controls the adjusting means.

With such a preferred embodiment the tube adjustment can be done automatically according to objective (measured) criteria. That is highly acceptable to the user.

Automatic adjustment according to measured criteria also eliminates an unpleasant phenomenon that has always existed. The user, in adjusting the oculars, involuntarily involves the adaptive capability of the eye, and thus does not get an optimal adjustment. That involves a certain amount of squinting, which causes fatigue. That can in some cases result in head pain or similar discomfort.

From this viewpoint in particular, the preferred variation by which the measuring instrument and the linked adjusting means follow the specific measured interpupillary distances, continuously, if desired, is optimal. It allows the eyes to be completely relaxed when using the microscope. "Continuous" in the sense of the invention means either continuous measurement with an assigned measuring instrument and continuous readjustment, or intermittent or case-to-case measurement and adjustment. The nature of the adjustment must be selected to meet the need, so that the desired adjustment is attained in the shortest possible time. Known trial-and-error processes other search strategies, themselves known, are thus part of the invention.

Other embodiments or variations of the invention appear or are described in the subclaims.

Measurement of the eye position relative to the center of the beam path is favorably accomplished by using an illuminator to illuminate the surface of the user's eye and a means to image this surface on a measuring sensor, especially but not limited to a CCD, which is positioned relative to the central axis of the beam path. Various instructions for technically achieving such systems for determining the position of a pupil of the user's eye, or the line of sight of this eye, can be found, for instance, in the following documents or the state of the technology cited therein:

U.S. Pat. Nos. 5,296,888; 5,245,371; European Patent Application 605 246; European Patent Application 602 895; German Patent Application 43 37 098. It will be possible for one skilled in the art to make combinations with the subjects of the documents cited, given knowledge of the teaching of this application.

To make a desirable reference possible for the automatic adjustment potentials, one embodiment provides a positioning rest for the head or face of the user. By fixing the user's facial parts it serves as a horizontal and/or vertical reference and/or relaxing rest for adjustment of the ocular (8) and the tube separation.

With such equipment, a user need only rest his head on the positioning rest and look toward the object in order to get the desired view of the object being examined. Then all the necessary adjustments are preferably made automatically, so that using hands on the microscope is superfluous. The same advantageous effect also occurs, of course, if this aspect of the invention is applied to other binocular instruments.

In order to avoid unnecessary measurement and adjustment there can be a provision such that a sensor or switch monitors the closeness of the head, so that an adjustment, once made, is retained even if the user removes his head from the vicinity of the tubes. That avoids waste movement of the measuring and adjusting systems.

The measuring process, and especially the emission of the IR measuring beam are preferably pulsed at the scan rate of the CCD used to avoid superfluous IR stress on the eye.

Combination with already known remote control mechanisms is also part of the invention. For instance, the subject of the invention can be combined with a foot switch, which differs from known previously known systems in having only a single function, such as that of "clicking on" or activating a corresponding symbol in the case of control by eye movement, or, for instance, commanding an adjustment cycle whenever the user wants one, as when there is a change of users.

Reference is also made to the teaching in Swiss Application 1092/94 which is a priority application regarding the published international patent application WO95/27918 by this applicant. The small superimposition elements disclosed there can be employed optimally in a magnification system according to the invention, as by directing a superimposed laser beam onto the eye.

In connection with the measurement of the distance between the main objective and the object or object detail to be viewed, which may be required, reference is made to the teaching of the Application PCT/EP95/01301 by the applicant which is considered disclosed here as a potential variant embodiment of the invention. This concerns especially the figures and the related description section. As an example, image signal processing can also be used to measure the sharpness in the eye of the portion of the object being viewed. For instance, the edge sharpness of certain contours can be measured. The sharpness of focus can be determined from that, and appropriate adjusting means can be controlled automatically to improve the image sharpness, giving a practically fully automatic magnifying instrument.

An independent invention, but one which is particularly favorably utilized along with the inventive features described above, appears if each ocular is given a device for deviating the beam path (e.g., four deviating mirrors) which deviates the ocular beam path or the magnification beam path of the magnifying instrument toward and away from the center of the instrument, so as to provide room for attachments between the oculars and the main objective (main objectives), in which, for example, video cameras, superimposing devices, LCD image screens, electronics, etc. can be placed. This is particularly applicable to, but not limited to, a video and/or surgical microscope, for which people have for a long time attempted to achieve compact structure.

Such a design allows a minimum of structural volume in the vicinity of the main objective(s) with the same, or even increased, stereo base.

Such a design is favorable in connection with the other features of the invention, as the ability to displace one of the deviating mirrors in each beam path laterally makes the desired adaptation to interpupillary distance achievable. As a rule, though, the movements of the oculars and tubes are also coupled with this adjustable deviating mirror so as to make optimal adjustment for the user possible with the view centered through each tube.

This special design offers another effect, which may even be independent of the adjustment for interpupillary distance. This is the fact that zoom installations, focusing equipment or the like can be installed at the place where the two binocular beam paths are nearest to each other. That gives savings in the quantity of lenses (if there were originally two separate zoom or focusing installations) or lens diameters (if only a single set of lenses had originally been provided for each beam path). It also reduces drive problems for these installations. Also, the zoom and focusing installations are made correspondingly small.

Other details and features of the invention are disclosed and characterized in the patent claims. To that extent, the preceding presentation does not limit the invention. The area of protection arises from the wording of the claims, the disclosure from the entire text of this and the cited applications by the applicant.

BRIEF DESCRIPTION OF THE DRAWINGS

The invention is explained in more detail by means of sketches of example embodiments. They show:

FIG. 2. Part of a binocular magnifying instrument with remotely controllable adjustment of tube separation.

FIG. 2a. A detail from FIG. 2.

FIG. 7. A symbolic representation of a measuring design to determine the positions of the user's pupils.

FIG. 8. A detail of a measuring design with an illuminated cross-hair and a deviating mirror.

DETAILED DESCRIPTION OF THE PREFERRED EMBODIMENTS

The figures are described together. The same reference numbers indicate the same parts. Parts with similar functions have the same reference numbers with different indices. With respect to the possibility of combination with the other patent applications by the applicant which have been mention, the list of reference numbers is essentially continuous.

Figure 1:
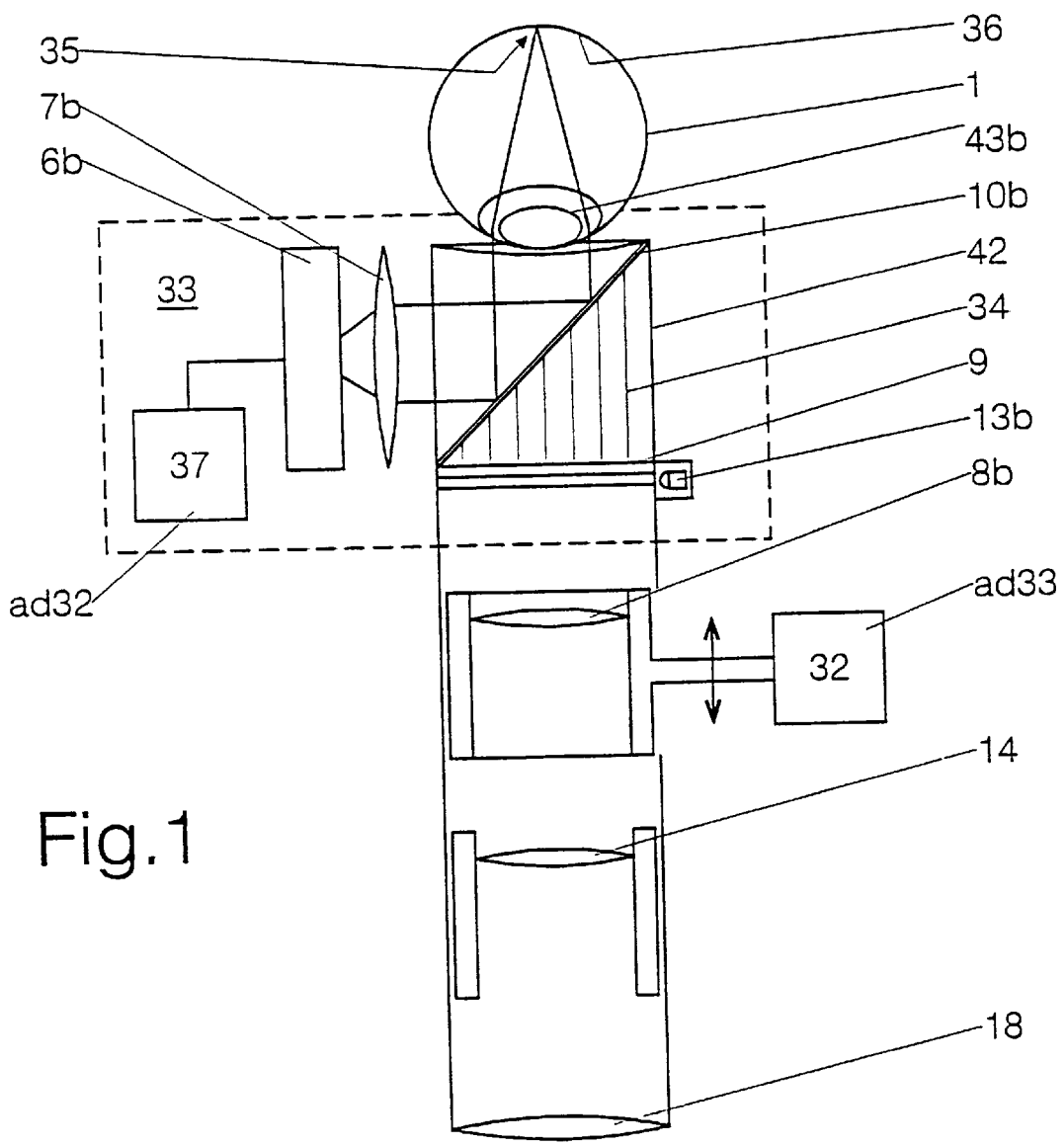
FIG. 1. A symbolic representation of a tube with a measuring instrument and adjustable ocular attached.
Figure 1A:
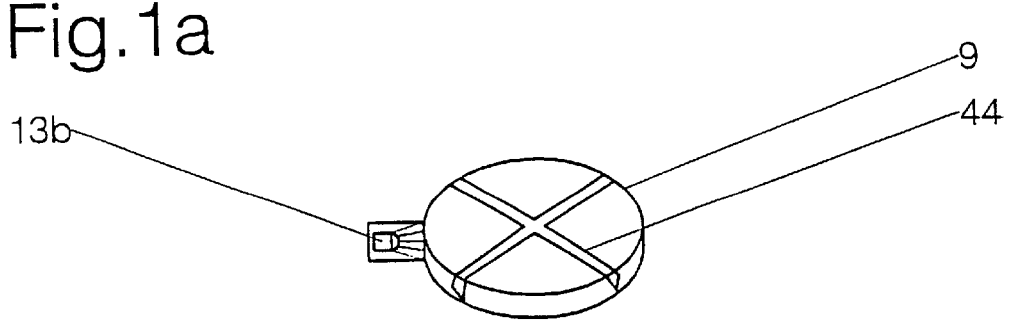
FIG. 1a. A detail from FIG. 1.

FIG. 1 shows a user's eye 1 with pupil 43b and retina 36, upon which there is formed the image 35 of a crosshair 9. The crosshair is used as an example in the following presentation, but it is usable independently of the other features which characterize the invention, so that it is a separate invention. It comprises a disk which is in principle completely transparent, with a light-emitting diode 13b coupled to its edge so that the disk is flooded with light. In the present case the light is particularly (but is not limited to) IR light. The coupling is made so that light beams from the light-emitting diode strike the glass/air or plastic/air interface only at an angle which gives total reflection. The top of the disk 44 is etched, sand-blasted, or the like, in the form of a crosshair, so that the total reflection is interrupted there and light is emitted.

A beam-splitting mirror lob is placed in front of the crosshair 9. The user's eye looks into the beam path and sees the crosshair. Thus the crosshair is imaged in the retina of the user's eye by the lens of the user's eye 1. The other side of the beam-splitting mirror 10b also works with a CCD 6b or an imaging optical system 7b which form the image 35 of the retina, or convert it into electronic pulses from which the optical properties of the eye can be determined in the known manner, e.g., by image processing, edge sharpness determination, etc. A measurement evaluation system 37 is provided for that purpose. Its output signal is returned to the drive means of an adjusting means 32, which adjusts the ocular 8b in the tube 42 so that any vision defects of the eye 1 are compensated.

An ordinary zoom and a main objective can also be seen in the tube 42.

In the example shown it is not important whether the view of the object is made possible solely by optical components, or whether there may be intermediate video signal processing, as with a video camera, for instance, in which the viewer adjusts the ocular with his own small image screen.

FIG. 2 shows symbolically a partial beam path of a binocular microscope with the center of the beam path, 45b. In the normal case that should be centered as well as possible through the pupil. A lateral tube adjustment, driven by the interpupillary distance adjusting means 40b is provided to accomplish that. The degree of centration is measured as follows:

A light-emitting diode (preferably IR light) 13a illuminates the surface of the eye. The image of the eye is imaged on a CCD 6b by the ocular 8b, mirror (10b, 39), a beam-dividing mirror 10c and the imaging optical system 7b. The pupil appears as a circular disk on the CCD 6b. As the CCD 6b is adjusted with respect to the center of the beam path 45, the measurement evaluation system 37 can detect whether the image of the pupil is centered on it. If it is acentric, 37 controls the adjustment of the tube with respect to the position of the eye through the adjusting means 40b.

The deviating mirror 41b is designed so that it is simultaneously a perforated or slotted mask. FIG. 2a shows a plan view of it. It has a thin cross-shaped or crosshair-like slot through which the light from the light-emitting diode 13b below it can pass into the eye. IR light is also preferred here, so that the slot, like the crosshair in FIG. 1, is invisible to the eye and is not perceived.

The image of the slot is formed on the retina 36 in the same manner as the crosshair 9. From there it is imaged through the ocular 8b and the deviating mirror 41b again onto the CCD 6b. Alternatively, a second CCD can be provided for evaluation of the optical properties of the user's eye. A drive is indicated in FIG. 2. It alters the imaging optical system 7b so that the eye surface and the retina are imaged alternately on the CCD. Imaging of the pupil 43 is important not only for centering the beam path but also for which commands which may if desired be given by the eye as described in the previously mentioned U.S. patent application Ser. No. 08/817,634.

If such objectives are omitted, the supplemental illumination by diode 13a can also be omitted, because then the light from the slot of the slotted mask 39 is enough to illuminate parts of the surface of the eye that evaluation of centering is possible.

As a rule, all the functions and controls of the instruments described are controlled by the data processing system. For faster data processing, according to the application cited, Swiss 1091/94 (Leica Box) a data preparation unit 25 is connected in advance of the data processing system 24. It converts all the data formats, some of which are different, to a commonly processable format or converts command data into suitable device control data.

Figure 3:
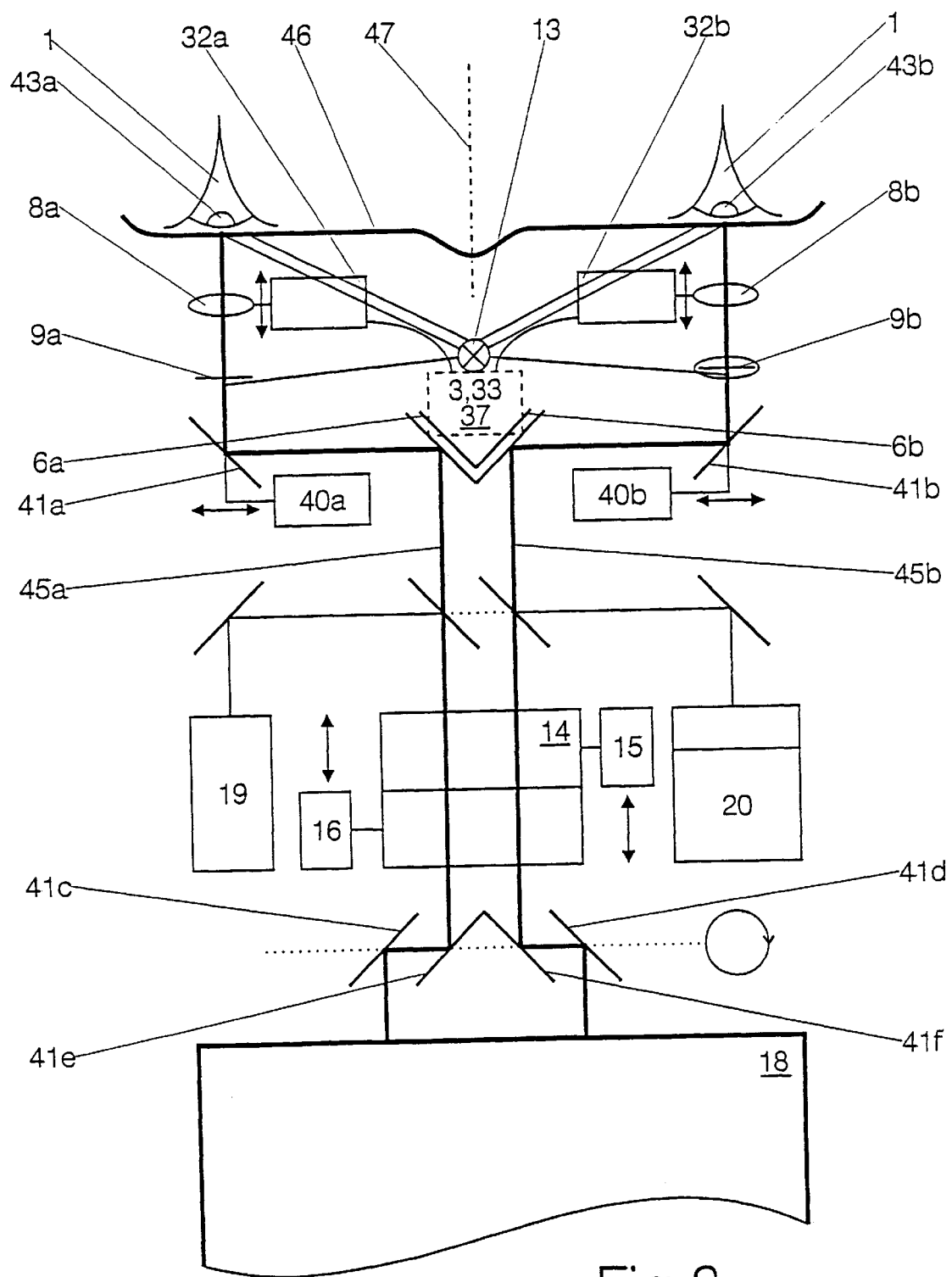
FIG. 3. A symbolic representation of a fully automatic microscope.

FIG. 3 shows schematically a positioning support 46 on which the user can rest his face so as to get into a reference position with respect to the microscope. This Figure differs from FIGS. 1 and 2 because here a crosshair 9b with incident infrared illumination is symbolized and the deviation mirrors 41a and b are not transparent to light.

FIG. 3 also shows the advantage of the relative movement of the tubes, which goes hand-in-hand with the invention. A single zoom apparatus 16 and a single focus adjustment means 14 can be used for both beam paths without limiting the stereobase in front of the main objective.

Figure 4:
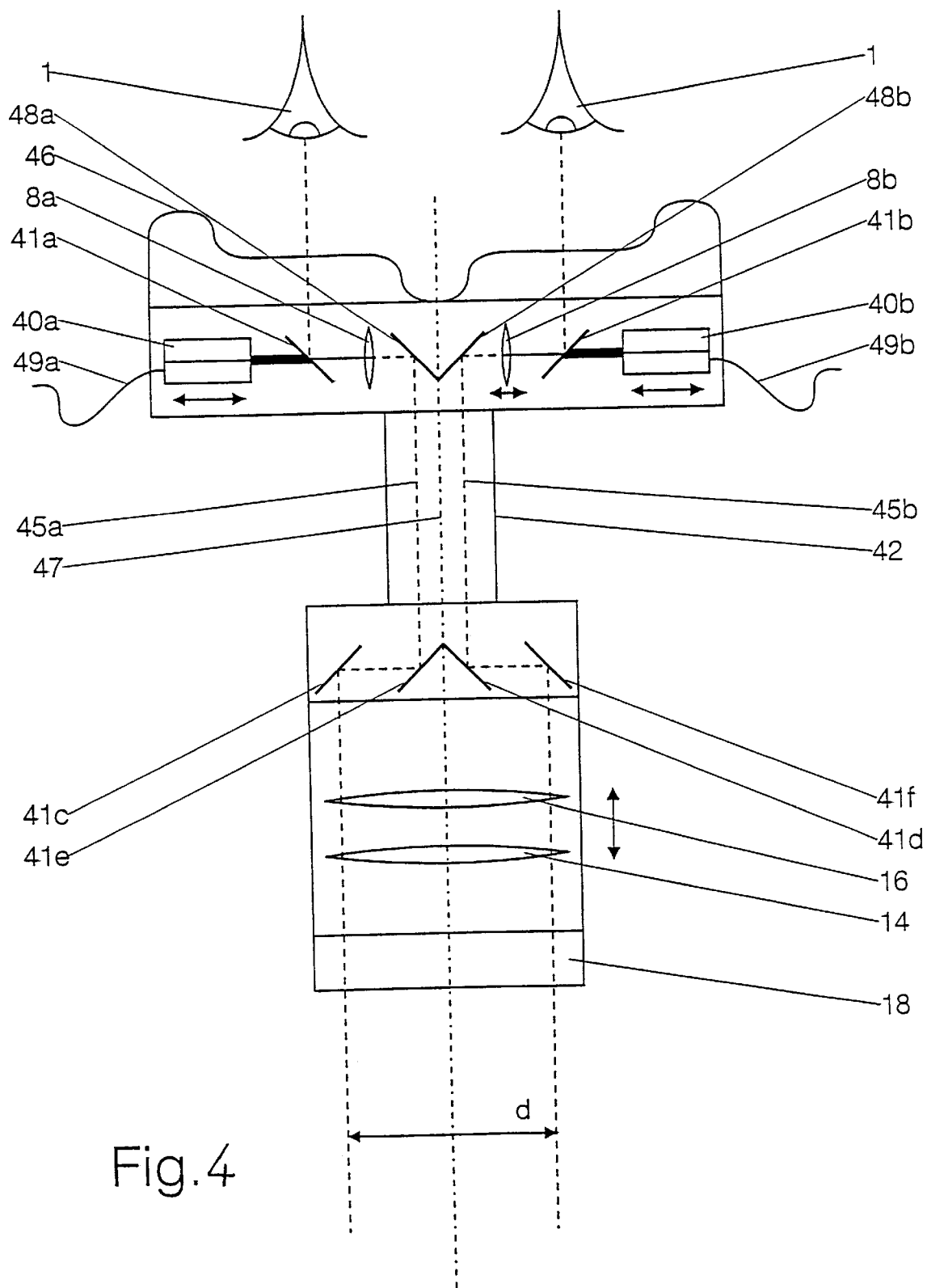
FIG. 4. A symbolic representation of a microscope with two oculars and a remotely controllable means for adjusting interpupillary distance according to the invention.

FIG. 4 shows two user eyes looking through a positioning support 46 for the user's face and through two laterally displaceable deviating mirrors 41b, which are remotely controllable from an interpupillary adjustment means 40ab. Corresponding remote control wiring is shown by 49a,b.

An ocular system 8a,b is inserted between the deviating mirrors 41 and the other deviating mirrors 48a,b which correspond to them. At least one of 8a,b is adjustable.

The two deviating mirrors 48 distinctly narrow the center of the instrument, so that a single tube 42 may suffice to contain both beam paths. An equal and opposite system of deviating mirrors 41c–f expands the stereobase d back to a desired dimension. A zoom system 16 and a magnification-changing mechanism 14 (or one zoom or one magnification-changer per beam path) can be placed in a way and means that is known after the deviating mirrors 41c–f.

Figure 5:
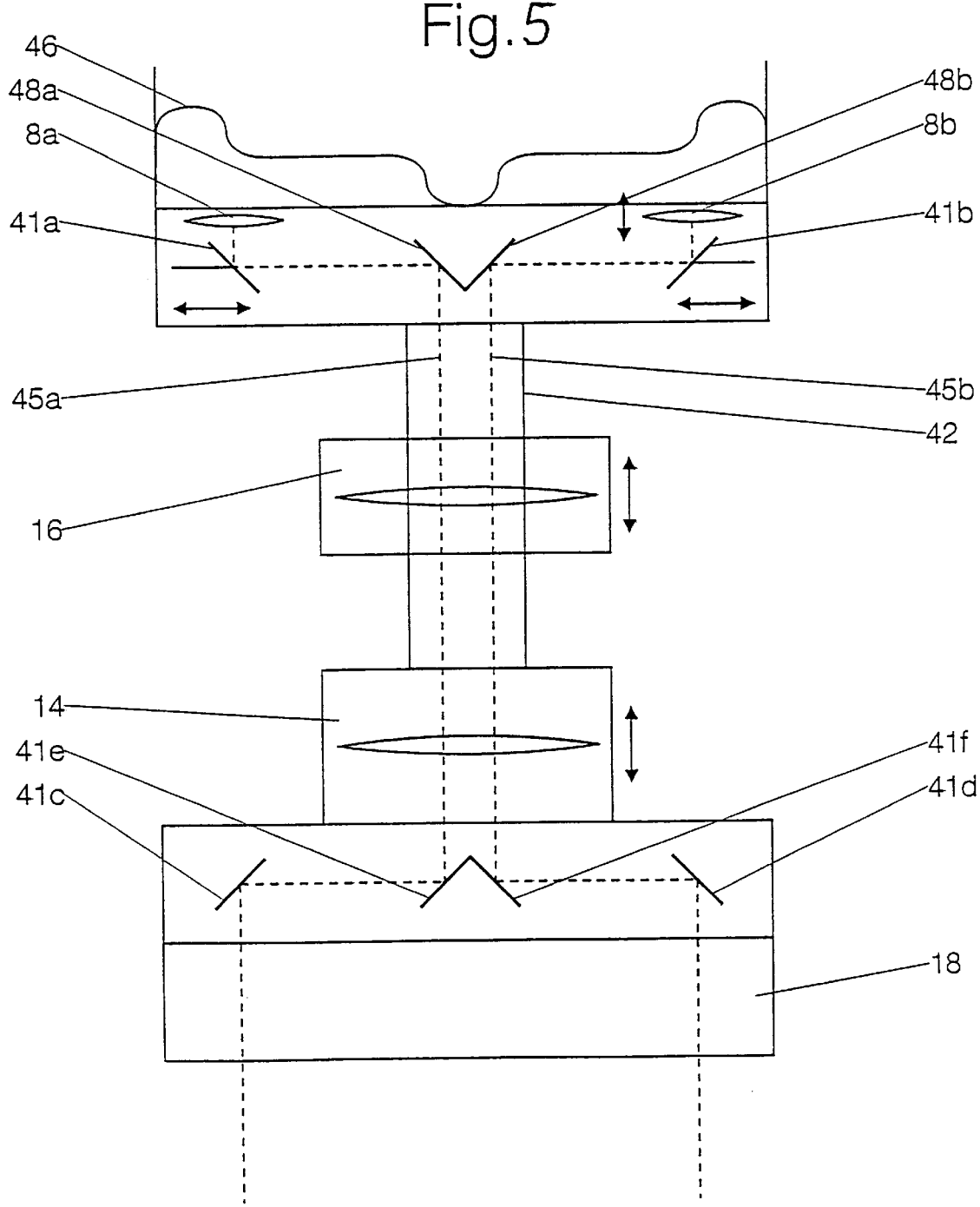
FIG. 5. A variation of the above with zoom and magnification adjustment in the boxed regions.

FIG. 5 shows a solution which is more elegant in comparison.

Figure 6:
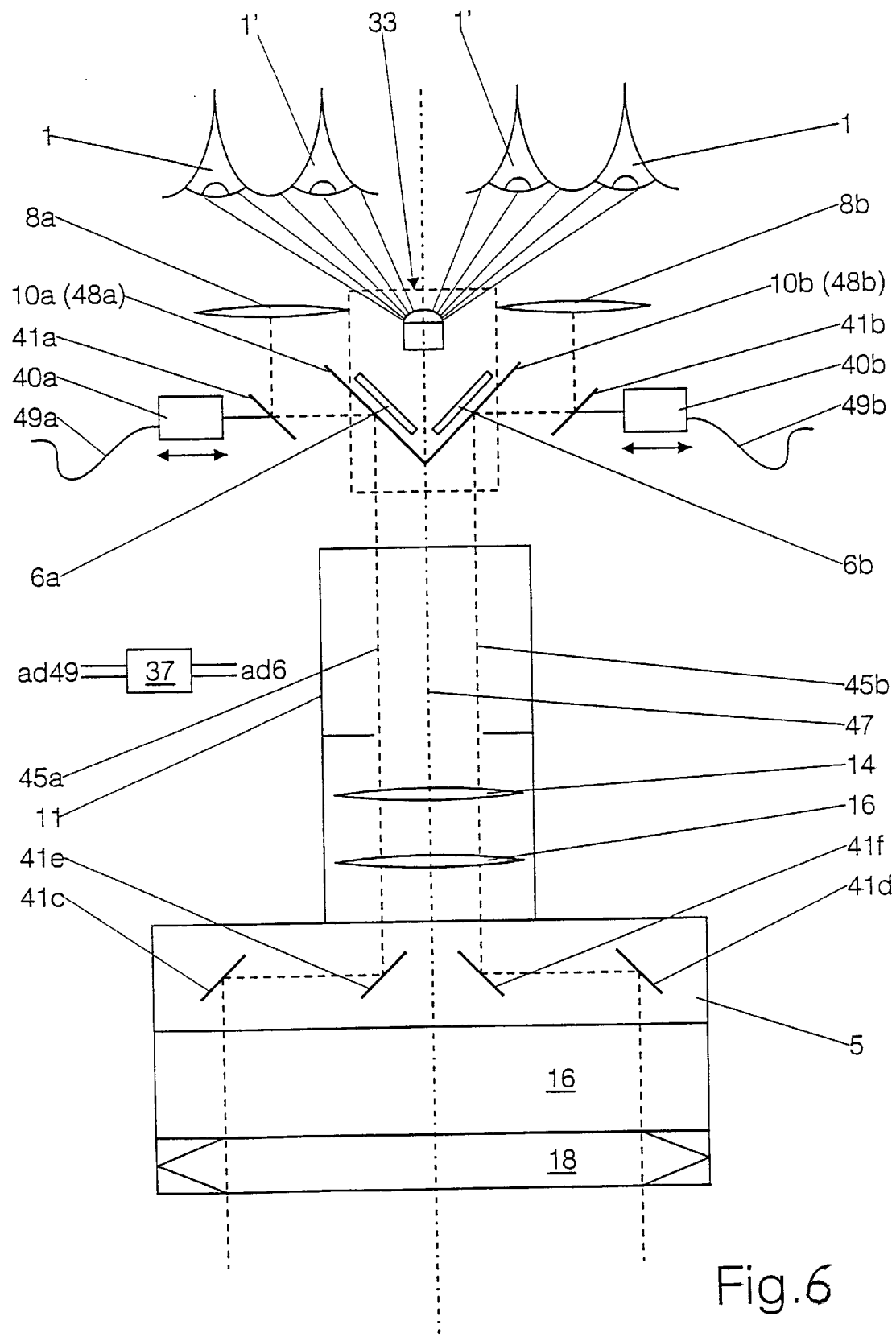
FIG. 6. A variation with a measuring instrument 33.
Figure 9:
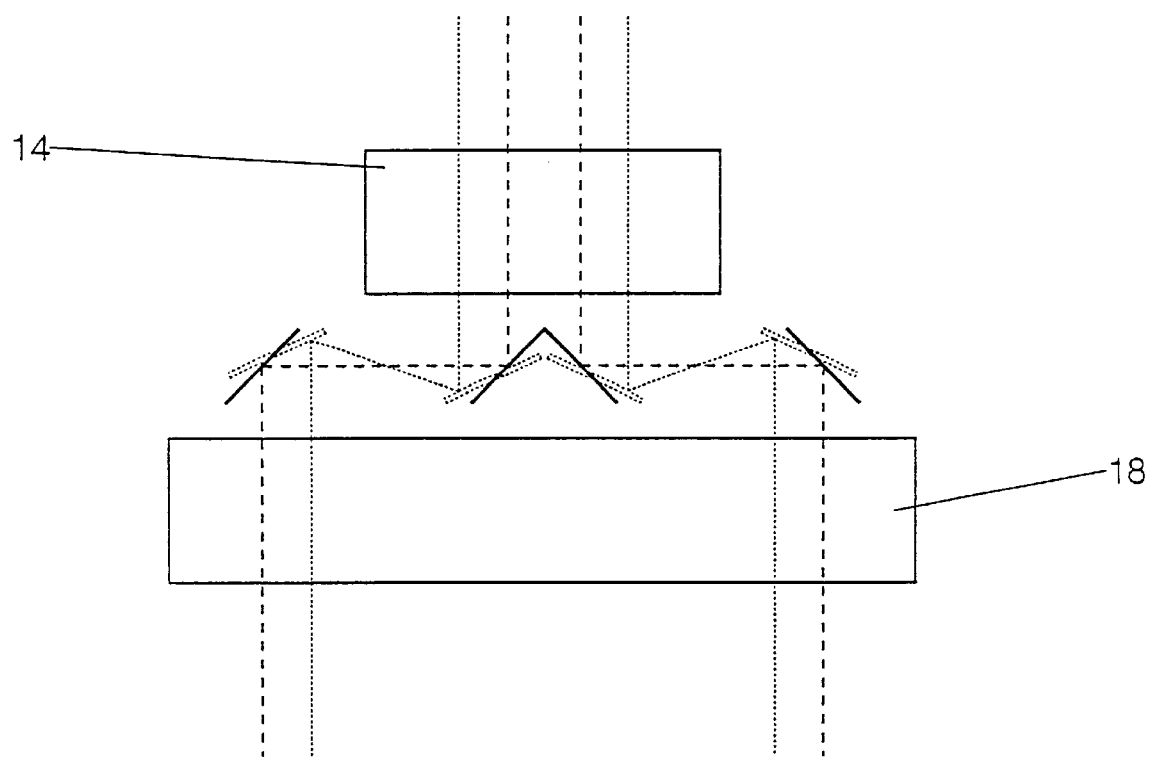
FIG. 9. A symbolic representation of compensation for a squint error with movable deviating mirrors in the beam path, coupled with the zoom adjustment, corresponding, for instance, to a structure according to German Patent Application 1-4123279, FIG. 7, as it could be utilized optimally according to a development of the invention.

FIG. 6 also shows the advantage of the movement of the tubes with respect to the center of the instrument 47, which goes hand-in-hand with the invention. Also, a single zoom 16 and a single focusing mechanism 14 can be used for both beam paths without limiting the stereobase in front of the main objective. One can find the same effect in FIG. 5, the subject of which also represents an invention even without remote control of the deviating mirrors 41a,b. The room gained at the side of the tube 42 can be used well, as FIG. 3 shows.

FIGS. 7 and 8 show symbolically an example of a measurement design. The adjustable ocular 8b can be symbolically adjusted in three dimensions to compensate for the interpupillary distance of the user and to compensate for the user's visual deficiency. Here the user's eye 1 with its surface and pupil 43 and its retina 36 are examined for position with respect to the center of the beam path 45b. A crosshair 9b1 or the like is imaged on the retina 36 as the image 35, by means of the light source 13b. The retina itself is imaged through the ocular 8b and through the crosshair 9b1, which is developed on a partially reflecting mirror, through another partially reflecting mirror 5b and if necessary through an imaging optical system 7b onto a measuring array or CCD (6b). The image of the pupil 43 is also formed on the latter. Furthermore the image of the crosshair 9b1 reflected at the ocular 8b can be imaged on the CCD 6b. From all the different images, or individual ones, the measuring system 33 or the measurement evaluation system 37 can calculate the actual pupil position with respect to the center of the beam path 45b. Then they can initiate appropriate controls through the adjusting means 32b or 41b.

FIG. 8 shows, by the heavy lines, a well centered beam path, while the dashed cross 13b' represents the imaging of the crosshair 9b1 on a non-centered user eye 1.

As a rule, all the functions and controls of the instrument described are controlled by the data processing system. A data preparation unit 25 can be connected ahead of the data processing system 24 for faster data processing, according to the cited Swiss Application 1091/94. It converts all the data formats, some of which are different, to a common format which can be processed, or it converts command to suitable instrument control data.

The application is not limiting to that extent, and includes also the combinations arising from the cited applications. The optimal end of the application is a fully automatic self-adjusting microscope.

German Patent Application 29 37 891 describes an example of an automatic eye refractometer, such as one skilled in the technology could adapt to the subject of the invention, given knowledge of the invention. Thus a combination with such a refractometer is part of the invention.

List of Reference Numbers

1 User's eye
2 LCD or CRT for display in the ocular beam path
3a,b System for detecting the pupil position
4a,b Superimposition element [see footnote #2]
5a,b Partially transparent IR mirror (reflection approaching 100% for IR, and approaching 0% for other radiation)
6a,b CCD or sensor with similar function for determining the pupil position
7a,b,c,d,e Imaging optics
8a,b Ocular lenses
9a,b,c Crosshair
10a,b,c,d,e,f Beam-dividing mirrors
11 LCD background illumination
12 Example of an image of the LCD or CRT as seen by the eye 1 through the ocular 8, superimposed on the image of the object being viewed.
13a,b LED for IR light, which may be pulsed or operating only during measurement
14a,b Zoom system
15 Zoom drive
16 Focus adjustment drive
17a,b Illumination
18 Main objective
19 Video recorder to record and play back video images
20 System to provide image for MRI data of the object being viewed
21 System to provide image for X-ray data of the object being viewed
22 Image information generator for patient-related information, such as name, age, blood pressure, cardiac function, etc.
23 Microscope
24 Data processing
25 Data preparation for a unified data format (Leica Box)
26 Video camera
27 Foot switch
28 Beam-splitter cube
29 Beam-splitting surface
30 Mirror surface, particularly for IR radiation
31 Reflecting fiber
32 Adjusting means
33 Measurement system includes at least 13, 6 and 37
34 Measurement beam
35 Image
35' Formation of the image 35
36 Retina
37 Measurement evaluation system
38 Memory
39 Perforated or slotted mask; can be reflective, also semi-transparent
40a,b Means for adjusting for interpupillary distance
41a,b Deviating mirror
42a,b Tube
43a,b Pupil
43' Imaging beam path for the image of the pupil
44 Thin etched tracks form the crosshair
45a,b Center of the beam path
46 Positioning rest
47 Center of the instrument
48a,b Cooperating deviating mirrors
49a,b Remote control wires
d Stereobase

What is claimed is:

1. A microscope comprising:

an optical path;

an eyepiece tube aligned on said optical path;

an ocular centered on said optical path and mounted within said eyepiece tube for motion along said optical path;

adjustment drive means for automatically moving said ocular along said optical path;

a measuring system for determining optical properties of a user's eye and providing an output signal representative of said optical properties, said adjustment drive means being connected to said measuring system for receiving said output signal and automatically moving said ocular in response to said output signal to compensate for vision defects of said eye and wherein said ocular is continually adjusted by said automatic drive means in response to changes in said output signal, and wherein said microscope is a stereomicroscope comprising a pair of optical paths each having a respective eyepiece tube, a respective ocular, a respective measuring system, and a respective adjustment drive means for automatic compensating adjustment of said respective ocular, said microscope further comprising a zoom portion and an objective lens.

2. The microscope according to claim 1, further comprising memory means for storing ocular adjustment data corresponding to said user and input means for specifying a user to said memory means to recall said corresponding adjustment data for pre-adjustment of said ocular based on the specified user.

3. The microscope according to claim 1, wherein each said respective measuring system includes means for producing an image on a retina of said eye, light detection means for observing said retinal image and generating a first signal representative of said retinal image, and measurement evaluation means for processing said first signal to generate said output signal.

4. The microscope according to claim 3, wherein said means for producing an image on said retina includes a crosshair disk positioned on said optical path, and a light source adjacent an edge of said disk for flooding said disk with light.

5. The microscope according to claim 4, wherein said light source is an infra-red light source.

6. The microscope according to claim 5, wherein said infra-red light source is a light emitting diode.

7. The microscope according to claim 3, wherein said means for producing an image on said retina includes a slotted mask positioned on said optical path, and a light source adjacent said slotted mask.

8. The microscope according to claim 7, wherein said light source is an infra-red light source.

9. The microscope according to claim 8, wherein said infra-red light source is a light emitting diode.

10. The microscope according to claim 9, wherein said infra-red light source is a laser diode.

11. The microscope according to claim 10, further including interpupillary adjustment drive means for moving at least one of said pair of eyepiece tubes laterally relative to another one of said pair of eyepiece tubes to provide a desired lateral spacing between said pair of optical paths through said pair of eyepiece tubes.

12. The microscope according to claim 11, wherein said interpupillary adjustment means is operated by remote control.

13. The microscope according to claim 11, wherein said measuring system determines the position of said respective optical path relative to a pupil of said user, and said interpupillary adjustment means is connected to said measuring system for adjusting said at least one eyepiece tube such that said pupil is centered on said respective optical path.

14. The microscope according to claim 11, wherein said measuring system includes a light source for illuminating a surface of said respective eye, light detection means for observing an image of said surface and generating a pupil signal representative of said surface image, and measurement evaluation means for processing said pupil signal to determine an eyepiece tube adjustment necessary to achieve said centering of said pupil on said respective optical path.

15. The microscope according to claim 14, wherein said retinal image and said surface image are observed on the same light detection means, and said retinal image is used to define the position of said respective optical path.

16. The microscope according to claim 11, further comprising a positioning rest near said pair of eyepiece tubes for fixing the head of said user vertically and horizontally to permit corrective adjustment of said pair of oculars and adjustment of the lateral spacing of said pair of eyepiece tubes.

17. The microscope according to claim 16, further comprising a proximity sensor in the vicinity of said positioning rest for monitoring the presence of a user, whereby the most recent ocular adjustments and eyepiece tube spacing adjustment are maintained in the absence of said user.

18. The microscope according to claim 1, further comprising sensor means for detecting the pupil position of said eye and generating a pupil signal representing said pupil position, and a data processing system for evaluating said pupil signal for use in controlling said microscope.

19. The microscope according to claim 1, further comprising a positioning rest near said pair of eyepiece tubes for fixing the head of said user vertically and horizontally to permit corrective adjustment of said pair of oculars.

20. The microscope according to claim 19, further comprising a proximity sensor in the vicinity of said positioning rest for monitoring the presence of a user, whereby the most recent ocular adjustments are maintained in the absence of said user.

21. The microscope according to claim 1, wherein each of said pair of optical paths is deviated by a first mirror in fixed alignment with said ocular on said optical path, a second mirror nearer a central axis of said microscope than said first mirror and cooperating with said first mirror, a third mirror nearer a central axis of said microscope than said first mirror and cooperating with said second mirror, and a fourth mirror further from said central axis than said third mirror and cooperating with said third mirror, whereby said pair of optical paths have a narrowed lateral spacing for passage through said zoom portion.

22. The microscope according to claim 21, wherein said fourth mirror of one of said pair optical paths is spaced laterally from said fourth mirror of another of said pair of optical paths to provide a desired stereobase of said microscope which is wider than said narrowed lateral spacing.

23. The microscope according to claim 21, wherein said third and fourth mirrors are adjustable for squint correction.

24. The microscope according to claim 21, wherein said zoom portion is a single zoom system provided for both of said pair of optical paths.

25. The microscope according to claim 21, further comprising a single focal length adjuster for both of said pair of optical paths.

26. A microscope comprising:

an optical path;

an eyepiece tube aligned on said optical path;

an ocular centered on said optical path and mounted within said eyepiece tube for motion along said optical path;

adjustment drive means for automatically moving said ocular along said optical path;

a measuring system for determining optical properties of a user's eye and providing an output signal representative of said optical properties, said adjustment drive means being connected to said measuring system for receiving said output signal and automatically moving said ocular in response to said output signal to compensate for vision defects of said eye, wherein said microscope is a stereomicroscope comprising a pair of optical paths each having a respective eyepiece tube, a respective ocular, a respective measuring system, and a respective adjustment drive means for automatic compensating adjustment of said respective ocular, said microscope further comprising a zoom portion and an objective lens;

sensor means for detecting the pupil position of said eye and generating a pupil signal representing said pupil position, and a data processing system for evaluating said pupil signal for use in controlling said microscope; and interpupillary adjustment drive means for moving at least one of said pair of eyepiece tubes laterally relative to another one of said pair of eyepiece tubes to provide a desired lateral spacing between said pair of optical paths through said pair of eyepiece tubes.

27. The microscope according to claim 26, wherein said interpupillary adjustment means is operated automatically.

28. The microscope according to claim 26, wherein said interpupillary adjustment means is operated by remote control.

29. The microscope according to claim 26, further comprising memory means for storing ocular adjustment data corresponding to said user and input means for specifying a user to said memory means to recall said corresponding adjustment data for pre-adjustment of said ocular based on the specified user.

30. The microscope according to claim 26, wherein said ocular is continually adjusted by said automatic drive means in response to changes in said output signal.

31. The microscope according to claim 26, wherein said measuring system includes means for producing an image on a retina of said eye, light detection means for observing said retinal image and generating a first signal representative of said retinal image, and measurement evaluation means for processing said first signal to generate said output signal.

32. The microscope according to claim 31, wherein said means for producing an image on said retina includes a crosshair disk positioned on said optical path, and a light source adjacent an edge of said disk for flooding said disk with light.

33. The microscope according to claim 32, wherein said light source is an infra-red light source.

34. The microscope according to claim 33, wherein said infra-red light source is a light emitting diode.

35. The microscope according to claim 31, wherein said means for producing an image on said retina includes a slotted mask positioned on said optical path, and a light source adjacent said slotted mask.

36. The microscope according to claim 35, wherein said light source is an infra-red light source.

37. The microscope according to claim 36, wherein said infra-red light source is a light emitting diode.

38. The microscope according to claim 36, wherein said infra-red light source is a laser diode.

39. The microscope according to claim 26, wherein each said respective measuring system includes means for producing an image on a retina of said eye, light detection means for observing said retinal image and generating a first signal representative of said retinal image, and measurement evaluation means for processing said first signal to generate said output signal.

40. The microscope according to claim 39, wherein said means for producing an image on said retina includes a slotted mask positioned on said optical path, and a light source adjacent said slotted mask.

41. The microscope according to claim 26, wherein said measuring system determines the position of said respective optical path relative to a pupil of said user, and said interpupillary adjustment means is connected to said measuring system for adjusting said at least one eyepiece tube such that said pupil is centered on said respective optical path.

42. The microscope according to claim 26, wherein said measuring system includes a light source for illuminating a surface of said respective eye, light detection means for observing an image of said surface and generating a pupil signal representative of said surface image, and measurement evaluation means for processing said pupil signal to determine an eyepiece tube adjustment necessary to achieve said centering of said pupil on said respective optical path.

43. The microscope according to claim 42, wherein said retinal image and said surface image are observed on the same light detection means, and said retinal image is used to define the position of said respective optical path.

44. The microscope according to claim 26, further comprising a positioning rest near said pair of eyepiece tubes for fixing the head of said user vertically and horizontally to permit corrective adjustment of said pair of oculars and adjustment of the lateral spacing of said pair of eyepiece tubes.

45. The microscope according to claim 44, further comprising a proximity sensor in the vicinity of said positioning rest for monitoring the presence of a user, whereby the most recent ocular adjustments and eyepiece tube spacing adjustment are maintained in the absence of said user.

46. The microscope according to claim 26, wherein each of said pair of optical paths is deviated by a first mirror in fixed alignment with said ocular on said optical path, a second mirror nearer a central axis of said microscope than said first mirror and cooperating with said first mirror, a third mirror nearer a central axis of said microscope than said first mirror and cooperating with said second mirror, and a fourth mirror further from said central axis than said third mirror and cooperating with said third mirror, whereby said pair of optical paths have a narrowed lateral spacing for passage through said zoom portion.

47. The microscope according to claim 46, wherein said fourth mirror of one of said pair optical paths is spaced laterally from said fourth mirror of another of said pair of optical paths to provide a desired stereobase of said microscope which is wider than said narrowed lateral spacing.

48. The microscope according to claim 46, wherein said third and fourth mirrors are adjustable for squint correction.

49. The microscope according to claim 46, wherein said zoom portion is a single zoom system provided for both of said pair of optical paths.

50. The microscope according to claim 46, further comprising a single focal length adjuster for both of said pair of optical paths.

51. A microscope comprising:

an optical path;

an eyepiece tube aligned on said optical path;

an ocular centered on said optical path and mounted within said eyepiece tube for motion along said optical path;

adjustment drive means for automatically moving said ocular along said optical path;

a measuring system for determining optical properties of a user's eye and providing an output signal representative of said optical properties, said adjustment drive means being connected to said measuring system for receiving said output signal and automatically moving said ocular in response to said output signal to compensate for vision defects of said eye, wherein said microscope is a stereomicroscope comprising a pair of optical paths each having a respective eyepiece tube, a respective ocular, a respective measuring system, and a respective adjustment drive means for automatic compensating adjustment of said respective ocular, said microscope further comprising a zoom portion and an objective lens and wherein said zoom portion is a single zoom system provided for both of said pair of optical paths.

52. The microscope according to claim 51, further comprising memory means for storing ocular adjustment data corresponding to said user and input means for specifying a user to said memory means to recall said corresponding adjustment data for pre-adjustment of said ocular based on the specified user.

53. The microscope according to claim 51, wherein said ocular is continually adjusted by said automatic drive means in response to changes in said output signal.

54. The microscope according to claim 51, wherein each said respective measuring system includes means for producing an image on a retina of said eye, light detection means for observing said retinal image and generating a first signal representative of said retinal image, and measurement evaluation means for processing said first signal to generate said output signal.

55. The microscope according to claim 54, wherein said means for producing an image on said retina includes a crosshair disk positioned on said optical path, and a light source adjacent an edge of said disk for flooding said disk with light.

56. The microscope according to claim 55, wherein said light source is an infra-red light source.

57. The microscope according to claim 56, wherein said infra-red light source is a light emitting diode.

58. The microscope according to claim 54, wherein said means for producing an image on said retina includes a slotted mask positioned on said optical path, and a light source adjacent said slotted mask.

59. The microscope according to claim 58, wherein said light source is an infra-red light source.

60. The microscope according to claim 59, wherein said infra-red light source is a light emitting diode.

61. The microscope according to claim 59, wherein said infra-red light source is a laser diode.

62. The microscope according to claim 51, further comprising sensor means for detecting the pupil position of said eye and generating a pupil signal representing said pupil position, and a data processing system for evaluating said pupil signal for use in controlling said microscope.

63. The microscope according to claim 51, further including interpupillary adjustment drive means for moving at least one of said pair of eyepiece tubes laterally relative to another one of said pair of eyepiece tubes to provide a desired lateral spacing between said pair of optical paths through said pair of eyepiece tubes.

64. The microscope according to claim 63, wherein said interpupillary adjustment means is operated by remote control.

65. The microscope according to claim 63, wherein said measuring system determines the position of said respective optical path relative to a pupil of said user, and said interpupillary adjustment means is connected to said measuring system for adjusting said at least one eyepiece tube such that said pupil is centered on said respective optical path.

66. The microscope according to claim 63, wherein said measuring system includes a light source for illuminating a surface of said respective eye, light detection means for observing an image of said surface and generating a pupil signal representative of said surface image, and measurement evaluation means for processing said pupil signal to determine an eyepiece tube adjustment necessary to achieve said centering of said pupil on said respective optical path.

67. The microscope according to claim 66, wherein said retinal image and said surface image are observed on the same light detection means, and said retinal image is used to define the position of said respective optical path.

68. The microscope according to claim 51, further comprising a positioning rest near said pair of eyepiece tubes for fixing the head of said user vertically and horizontally to permit corrective adjustment of said pair of oculars.

69. The microscope according to claim 68, further comprising a proximity sensor in the vicinity of said positioning rest for monitoring the presence of a user, whereby the most recent ocular adjustments are maintained in the absence of said user.

70. The microscope according to claim 51, further comprising a positioning rest near said pair of eyepiece tubes for fixing the head of said user vertically and horizontally to permit corrective adjustment of said pair of oculars and adjustment of the lateral spacing of said pair of eyepiece tubes.

71. The microscope according to claim 70, further comprising a proximity sensor in the vicinity of said positioning rest for monitoring the presence of a user, whereby the most recent ocular adjustments and eyepiece tube spacing adjustment are maintained in the absence of said user.

72. The microscope according to claim 51, wherein each of said pair of optical paths is deviated by a first mirror in fixed alignment with said ocular on said optical path, a second mirror nearer a central axis of said microscope than said first mirror and cooperating with said first mirror, a third mirror nearer a central axis of said microscope than said first mirror and cooperating with said second mirror, and a fourth mirror further from said central axis than said third mirror and cooperating with said third mirror, whereby said pair of optical paths have a narrowed lateral spacing for passage through said zoom portion.

73. The microscope according to claim 72, wherein said fourth mirror of one of said pair optical paths is spaced laterally from said fourth mirror of another of said pair of optical paths to provide a desired stereobase of said microscope which is wider than said narrowed lateral spacing.

74. The microscope according to claim 72, wherein said third and fourth mirrors are adjustable for squint correction.

75. The microscope according to claim 72, further comprising a single focal length adjuster for both of said pair of optical paths.

76. The microscope according to claim 51, further comprising a single focal length adjuster for both of said pair of optical paths.

* * * * *